(12) United States Patent
Andresen et al.

(10) Patent No.: US 10,571,678 B2
(45) Date of Patent: Feb. 25, 2020

(54) DEVICE AND METHOD FOR CONTROLLING GROUP VELOCITY DELAYS OF PULSES PROPAGATING IN MONOMODE OPTICAL FIBERS OF A FIBER BUNDLE

(71) Applicants: Centre National de la Recherche Scientifique, Paris (FR); Université d'Aix-Marseille, Marseilles (FR)

(72) Inventors: Esben Andresen, Marseilles (FR); Hervé Rigneault, Allauch (FR)

(73) Assignees: Centre National de la Recherche Scientifique, Paris (FR); Université d' Aix-Marseille, Marseilles (FR)

( * ) Notice: Subject to any disclaimer, the term of this patent is extended or adjusted under 35 U.S.C. 154(b) by 320 days.

(21) Appl. No.: 15/536,881

(22) PCT Filed: Dec. 17, 2015

(86) PCT No.: PCT/EP2015/080312
§ 371 (c)(1),
(2) Date: Sep. 8, 2017

(87) PCT Pub. No.: WO2016/097191
PCT Pub. Date: Jun. 23, 2016

(65) Prior Publication Data
US 2018/0011309 A1  Jan. 11, 2018

(30) Foreign Application Priority Data
Dec. 18, 2014 (FR) .................................. 14 62809

(51) Int. Cl.
*G02B 6/02* (2006.01)
*G02B 6/06* (2006.01)
(Continued)

(52) U.S. Cl.
CPC ........... *G02B 23/2469* (2013.01); *G02B 6/06* (2013.01); *G02B 21/0004* (2013.01);
(Continued)

(58) Field of Classification Search
CPC ...... G02B 6/06; G02B 6/065; G02B 23/2469; G02B 23/26; G02B 21/0004; H01S 3/0057
See application file for complete search history.

(56) References Cited

U.S. PATENT DOCUMENTS 5,120,953 A * 6/1992 Harris ..................... G02B 21/18
250/216
7,146,069 B1 * 12/2006 Bowers ................ G02B 6/2861
385/18

(Continued)

OTHER PUBLICATIONS

International Search Report and Written Opinion issued in corresponding International Application No. PCT/EP2015/080312, dated Mar. 30, 2016 (18 pages).
(Continued)

*Primary Examiner* — Akm E Ullah
(74) *Attorney, Agent, or Firm* — Osha Liang LLP

(57) ABSTRACT

According to one aspect, the invention concerns a device for transporting and controlling light pulses for lensless endomicroscopic imaging and comprises:
a bundle of N monomode optical fibers ($F_j$) arranged in a given pattern, each monomode optical fiber being characterized by a relative group delay value (Ax) defined relative to the travel time of a pulse propagating in a reference monomode optical fiber ($F_0$) of the bundle of fibers (40),
an optical device for controlling group velocity (50) comprising a given number M of waveplates ($P_j$) characterized by a given delay ($8t_j$); a first spatial light modulator (51) suitable for forming from an incident
(Continued)

light beam a number N of elementary light beams ($B_i$) each of which is intended to enter into one of said optical fibers, each elementary beam being intended to pass into a given waveplate such that the sum of the delay introduced by said waveplate and the relative group delay of the optical fiber intended to receive said elementary light beam is minimal in absolute value; a second spatial light modulator (52) suitable for deviating each of the N elementary light beams such that each elementary light beam penetrates into the corresponding optical fiber perpendicularly to the entrance face of the optical fiber.

11 Claims, 12 Drawing Sheets

(51) Int. Cl.
*G02B 23/24* (2006.01)
*G02B 21/00* (2006.01)
*G02B 23/26* (2006.01)
*H01S 3/00* (2006.01)

(52) U.S. Cl.
CPC ............ *G02B 23/26* (2013.01); *H01S 3/0057* (2013.01); *G02B 6/02042* (2013.01); *G02B 6/065* (2013.01)

(56) References Cited

U.S. PATENT DOCUMENTS

| | | | | |
|---|---|---|---|---|
| 8,585,587 | B2* | 11/2013 | French | A61B 1/00165 600/178 |
| 2006/0067611 | A1* | 3/2006 | Frisken | G02B 6/272 385/16 |
| 2010/0220293 | A1* | 9/2010 | Mizushima | G02B 6/06 353/20 |
| 2011/0137126 | A1 | 6/2011 | French et al. | |
| 2015/0015879 | A1* | 1/2015 | Papadopoulos | G02B 23/26 356/301 |
| 2015/0157199 | A1* | 6/2015 | Sapiens | A61B 3/0025 351/214 |
| 2016/0242633 | A1* | 8/2016 | Chung | A61B 1/00172 |
| 2019/0028641 | A1* | 1/2019 | Rigneault | G02B 6/06 |

OTHER PUBLICATIONS

Esben Ravn Andresen et al.; "Toward endoscopes with no distal optics: video-rate scanning microscopy through a fiber bundle"; Optics Letters, Optical Society of America; vol. 38, No. 5; pp. 609-611; 2013 (3 pages).

Esben Ravn Andresen et al.; "Two-photon lensless endoscope"; Optics Express; vol. 21, No. 18; pp. 20713-20721; 2013 (9 pages).

David R. Rivera et al.; "Compact and flexible raster scanning multiphoton endoscope capable of imaging unstained tissue"; PNAS; vol. 108, No. 43; pp. 17598-17603; 2011 (6 pages).

Tomas Cizmar et al.; "Exploiting multimode waveguides for pure fibre-based imaging"; Nature Communications; pp. 1-9; 2012 (9 pages).

J. Liesener et al.; "Multi-functional optical tweezers using computer-generated holograms"; Optics Communications, Elsevier Science B.V.; pp. 1-6; 2000; (6 pages).

J.H. Bruning et al.; "Digital Wavefront Measuring Interferometer for Testing Optical Surfaces and Lenses"; Applied Optics; vol. 13, No. 11; pp. 2693-2703; 1974 (11 pages).

* cited by examiner

DEVICE AND METHOD FOR CONTROLLING GROUP VELOCITY DELAYS OF PULSES PROPAGATING IN MONOMODE OPTICAL FIBERS OF A FIBER BUNDLE

PRIOR ART

Technical Field of the Invention

The present invention concerns a device for transporting and controlling light pulses for so-called "lensless" endo-microscopic imaging, as well as systems and methods of lensless endo-microscopic imaging, in particular nonlinear imaging. It applies in particular to the endoscopic exploration of organs in a living creature, human or animal.

Prior Art

Developments in endo-microscopic imaging require the use of optomechanical fiber devices having specific features as compared to the imager systems in free space.

On the one hand, the design of a miniature microscope comprising a light source, a focusing lens, and a camera at the distal end (that is, located at the end of the fiber, at the side with the specimen) of a medical endoscope is not feasible due to the bulky size of the components involved. One therefore looks for solutions enabling an imaging at the tip of an optical fiber while limiting the size of the endoscope at the distal end.

On the other hand, the increasing interest in nonlinear imaging for endo-microscopy requires one to work with light pulses having strong light intensity, which is not always compatible with fiber systems. Among the techniques of nonlinear imaging one could mention, for example, two-photon excited fluorescence (TPEF). This imaging technique is particularly interesting in endo-microscopy because the interaction between light and matter is confined to the focal point, and so there is no background signal generated outside of the focal point and therefore a three-dimensional spatial resolution is possible, enabling an optical sectioning. TPEF imaging furthermore allows the use of an excitation laser with near-infrared wavelength, which penetrates more deeply into a diffusing medium such as a biological tissue. Other nonlinear processes may prove interesting in endo-microscopy to acquire supplemental information; such is the case with 3PEF or Three-Photon Excited Fluorescence, SHG or Second-Harmonic Generation, THG or Third-Harmonic Generation, CARS or Coherent Anti-Stokes Raman Scattering, and SRS or Stimulated Raman Scattering.

There are many approaches enabling an imaging at the tip of an optical fiber while limiting the overall size at the distal end of the endoscope, these techniques being more or less adapted to nonlinear imaging.

A first approach (described, for example, in Rivera et al., "Compact and flexible raster scanning multiphoton endoscope capable of imaging unstained tissue", Proc. Nat. Acad. Sci. USA, 108, 17598 (2011)) consists in causing the distal portion of a monomode optical fiber to vibrate, for example, with the aid of piezoelectric wedges, the tip of the optical fiber being imaged in the specimen with the aid of a micro-lens. The optical fiber makes it possible to deliver the light to the specimen and collect the signal coming from the specimen, this signal being produced for example by reflection, by fluorescence, or by a nonlinear interaction in the specimen. However, the presence of a piezoelectric scanner at the tip of the fiber limits the diameter below which the distal portion of the endoscope can be miniaturized (typically on the order of 3 mm); furthermore, control of the imaging plane along the optical axis is hard to carry out. Finally, this approach is limited to nonlinear imaging which requires the use of ultrashort pulses (typically less than a picosecond). In fact, standard optical fibers have a strong dispersion which is hard to pre-compensate and they are subject to nonlinear effects which affect the spectral and temporal profiles of the light pulse delivered at the tip of the fiber.

It is likewise common to use a bundle of optical fibers (possibly containing up to 30000 fibers) and to illuminate the fibers one by one thanks to a scanner situated at the proximal end (see, for example, Knittel et al., "Endoscope-compatible confocal microscope using a gradient index-lens system", Opt. Commun. 188, 267 (2001)). The optical fibers are imaged in the specimen by a micro-lens situated in the distal portion and a sequential scanning of the optical fibers of the bundle of fibers makes it possible to obtain an image in the same way as in a confocal microscope. However, as in the previously described approach, the entire light circulates in the core of a single optical fiber and the maximum peak power is limited due to intrinsic nonlinear effects present in the optical fibers of the bundle of fibers. It is therefore difficult to perform a nonlinear imaging which requires ultrashort pulses, and thus elevated peak powers.

A third approach, called "lensless endoscopy", and described for example in Cizmar et al. "Exploiting multimode waveguides for pure fibre-based imaging", Nat. Commun. 3, 1027 (2012), is based on the use of a multimode optical fiber, or MMF. The MMF optical fiber is illuminated with a coherent source. At the proximal side (that is, at the entrance of the optical fiber, on the side opposite the specimen) of the MMF optical fiber, a spatial wavefront modulator (SLM or "Spatial Light Modulator") allows an influencing of the modes of propagation of the fiber so that the coherent addition of these modes makes it possible to generate every intensity pattern at the tip of the MMF fiber. In one embodiment, one tries to produce a focal point at the tip of the MMF fiber and scan the specimen in order to obtain an image such as would be done in a classical layout of confocal microscopy. This technique, extremely powerful on account of the deterministic nature of the transmission matrix of the fiber relating an entry field at the proximal portion of the fiber to an exit field at the distal portion (and vice versa), makes it possible to do without any lens at the distal side of the multimode fiber and thus reduce the overall size. However, the transmission matrix of the fiber is complex and highly dependent on the curvature of the MMF optical fiber. Endo-microscopic imaging by means of a MMF optical fiber is thus extremely sensitive to any movement of the fiber. Furthermore, due to the multimode nature, a short pulse at the proximal portion is greatly elongated at the distal portion, which limits the possible applications to nonlinear imaging.

In parallel with technologies based on the use of multimode fibers, another technology of "lensless" type has been developed, based on the use of a bundle of monomode optical fibers (see, for example, French et al. U.S. Pat. No. 8,585,587). According to the technique described, a spatial wavefront modulator (SLM) arranged at the proximal side of the bundle of monomode optical fibers makes it possible to control at the distal end of the bundle of fibers the wavefront emitted by a light source. Since there is only one mode and thus no mode dispersion in the monomode optical fibers and it is possible to compensate for the effects of chromatic dispersion in an overall manner, the use of a bundle of monomode optical fibers as compared to multimode fibers enables the propagation of short pulses. Furthermore, the possibility of distributing the light energy over all of the fibers enables the propagation of high intensity pulses, opening up the prospect of nonlinear endo-microscopic imaging.

Various publications have described variants of lensless endo-microscopy based on a bundle of monomode optical fibers and more particularly a multi-core fiber (MCF). Thus, for example, it has been shown how to accomplish, at the distal portion of the bundle of optical fibers, a very rapid scanning of the focusing point by imprinting, with the help of a galvanometric device, a variable wavefront angle at the entrance of the SLM (see, for example, E. R. Andresen et al. "Toward endoscopes with no distal optics: video-rate scanning microscopy through a fiber bundle", Opt. Lett. Vol. 38, No. 5 (2013)). In E. R. Andresen et al. ("Two-photon lensless endoscope", Opt. Express 21, 20713 (2013)) the authors demonstrated the experimental feasibility of a two-photon nonlinear imaging system (TPEF) in lensless endo-microscopy.

FIG. 1A illustrates in schematic fashion a system of lensless endo-microscopic imaging 100 as described in the prior art and applied in particular to nonlinear imaging. The imaging system 100 generally comprises a source of emission 10 for emitting an incident beam formed of pulses $I_0$ in the case of the application to nonlinear imaging. The system 100 furthermore comprises a detection pathway comprising a lens 21 and a detector 20. The detection pathway is separated from the emission pathway by a separating plate 22. The imaging system 100 likewise comprises a device for transporting and controlling of pulses $I_0$ making it possible to illuminate a remote object of analysis 101. The transporting and controlling device comprises a bundle of monomode optical fibers 40 whose entry 41 and exit 42 faces are represented in magnified fashion in FIG. 1A, and a spatial wavefront modulator ("SLM") 30 arranged at the proximal end of the bundle of fibers 40 and making it possible to control the wavefront of the beam emitted by the source 10. The spatial light modulator makes it possible to imprint on the entry wavefront having a phase function $\Phi_0$ defined phase shifts $\Phi_1(i)$ for each elementary beam $B_i$ intended to enter into an optical fiber $F_i$ of the bundle of fibers 40. The phase function $\Phi_1(i)$ might be such that, for example, after propagating in the bundle of optical fibers, the wave exits with a parabolic phase $\Phi_2(i)$. This parabolic phase allows the beam to be focused at the distal side on the object of analysis 101 without any physical lens being present: thus the term "lensless endoscope". Furthermore, it is possible for the spatial light modulator to compensate for shifts introduced by each of the optical fibers $F_i$.

However, the patent applicants have shown that, in a nonlinear imaging mode, i.e., when ultrashort pulses are sent along the bundle of monomode optical fibers, typically being pulses with duration less than a picosecond, the group delays of the pulses traveling in the different optical fibers may generate a loss of light intensity at the specimen. One may express the electromagnetic field $E^{(i)}(t)$ describing an elementary beam $B_i$ formed of pulses at the distal end of the bundle of fibers in the form:

$$E^{(i)}(t) = \varepsilon(t - \Delta x(i))e^{i\varphi(i)}$$

where $\varepsilon(t) = E^{(0)}(t)$ is the electromagnetic field describing the elementary beam $B_0$ propagating in the fiber $F_0$ taken as a reference, $\varphi(i)$ represents the phase term and $\Delta x(i)$ is the relative group delay defined in relation to the travel time of the elementary beam $B_0$ in the reference fiber $F_0$.

As is illustrated in FIG. 1B where only the transporting and controlling device for the incident beam is represented, the group velocities $X_1(i)$ of the pulses forming the elementary beams $B_i$ at the exit from the SLM 30 and incident on the optical fibers $F_i$ of the bundle of fibers 40 are constant. In other words, the relative group delays are zero or nearly zero. On the other hand, one observes at the distal exit from the fiber bundle variable group velocities in the different elementary beams described by the function $X_2(i)$ and translating into non-zero relative group delays $\Delta x(i)$. These group delays are introduced by each of the monomode optical fibers $F_i$ and result in intrinsic inhomogeneities appearing inevitably during the fabrication of the fiber as well as inhomogeneities induced by constraints during a deformation and/or during a movement of the fiber. As a result, at the distal exit from the bundle of fibers 40 there is a temporal broadening of the pulse focused on the object of analysis 101, this broadening being accompanied by a decrease in the peak light intensity and consequently a decrease in the signal produced by the nonlinear process.

The present invention proposes devices and methods for transporting and controlling light pulses in a so-called "lensless" endo-microscopic imaging system enabling a controlling of group velocity delays of the pulses in the monomode optical fibers of the fiber bundle. The devices and methods described in the present description make it possible to control at the distal end of the fiber bundle the duration of the pulses and thus achieve nonlinear imaging applications which require the transmission of ultrashort pulses, typically less than a picosecond.

SUMMARY OF THE INVENTION

According to a first aspect, one or more embodiments concern a device for transporting and controlling light pulses having at least one wavelength for lensless endo-microscopic imaging. The device comprises a bundle of N monomode optical fibers arranged in a given pattern, intended to receive a light beam formed of pulses at a proximal end and to emit a light beam at a distal end, each monomode optical fiber being characterized by a relative group delay value defined in relation to the travel time of a pulse propagating in a reference monomode optical fiber of the bundle of fibers.

The device for transporting and controlling light pulses furthermore comprises an optical device for controlling the group velocity or more precisely an optical device for controlling group delays, arranged at the proximal end of the bundle of optical fibers and comprising:
- a given number M of waveplates, each plate enabling the introducing of a given delay;
- a first spatial light modulator suitable for forming from one or more incident light beams a number N of elementary light beams each of which is intended to enter into one of said optical fibers, each elementary beam being intended to pass into a given waveplate such that the sum of the delay introduced by said waveplate and the relative group delay of the optical fiber intended to receive said elementary light beam is minimal in absolute value;
- a second spatial light modulator suitable for deviating each of the N elementary light beams such that each elementary light beam penetrates into the corresponding optical fiber perpendicularly to the entrance face of the optical fiber.

The bundle of N monomode optical fibers may be formed by an assemblage of monomode optical fibers, typically between a hundred and several tens of thousands of fibers, grouped together in the form of a bundle of fibers, in periodic or aperiodic manner, or it may be formed by a multiple-core fiber having an assemblage of monomode cores, preferably at least a hundred, arranged in periodic or aperiodic manner.

Whether it is an assemblage of monomode optical fibers grouped into a bundle or a multiple-core fiber, the goal is to have a bundle of monomode optical fibers with the least possible coupling, advantageously less than −20 dB/m.

The M waveplates are advantageously distributed in a plane. The number M of waveplates may be between 1 and several dozen, advantageously between 2 and 20, but in any case it is much less than the number N of monomode optical fibers in the bundle of fibers.

Thus, the device for transporting and controlling according to the present specification is able to minimize the standard deviation for the set of values formed by the group delays of the pulses in the fibers, regardless of the bundle of fibers used and even if the bundle of fibers is displaced or deformed; this is made possible by the simple programming of each of the spatial light modulators so as to form elementary beams each elementary beam intended to pass into each of the fibers of the bundle of fibers and to control their displacement so that they pass into the appropriate waveplate.

The device for transporting and controlling according to the present specification may also make possible, by programming of one and/or the other of the spatial light modulators, the application of a phase shift to each of the elementary beams, enabling the imprinting at the distal end of the bundle of fibers of a predetermined phase function and/or the correcting of the phase variations introduced by each of the fibers of the bundle of fibers.

The device for transporting and controlling according to the present specification may also make possible the transporting and controlling of beams formed of pulses with different wavelengths, by programming of the first spatial light modulator in order to assure the distribution of the elementary light beams formed of pulses at different wavelengths in the subset of distinct fibers of the bundle of fibers.

The spatial light modulators may comprise deformable segmented or membrane mirrors (operating by reflection) or liquid crystal arrays operating by reflection or by transmission.

Thus, the optical device for controlling the group velocity may comprise elements operating by reflection and/or transmission, although a reflection layout has the advantage of greater choice as to the technology of the spatial light modulators.

According to one or more sample embodiments, the optical device for controlling the group velocity comprises a first lens and a second lens forming an optical layout with an intermediate focal plane; the waveplates are disposed in the intermediate focal plane of the optical layout; the first spatial light modulator is located in the object focal plane of the first lens; and the second spatial light modulator is located in an image focal plane of the second lens.

According to one or more sample embodiments, the optical device for controlling the group velocity comprises a lens; the waveplates are disposed in a plane situated upstream from the first spatial light modulator and are adapted to form, from an incident beam formed of pulses, M light beams, each light beam being formed of pulses characterized by a given group delay; the first spatial light modulator is arranged in the object focal plane of the lens and is intended to receive said M light beams; the second spatial light modulator is located in an image focal plane of the lens.

For example, the first spatial light modulator is formed from M zones, on which are formed computer-generated holograms, each hologram being intended to receive one of said light beams formed of pulses characterized by a given group delay.

According to a second aspect, one or more embodiments concern a system of endo-microscopic imaging comprising a source of light pulses, a device for transporting and controlling the pulses emitted by said source according to the first aspect and a detection path for the light intended to pass through the bundle of monomode optical fibers from its distal end to its proximal end.

According to one or more sample embodiments, the source of light pulses is a laser source emitting of duration less than one picosecond, advantageously between 100 femtoseconds and 1 picosecond.

According to a third aspect, one or more embodiments concern a method of nonlinear lensless endo-microscopic imaging by means of a bundle of monomode optical fibers arranged in a given pattern and each one characterized by a relative group delay defined relative to the travel time of a pulse propagating in a reference monomode optical fiber of the bundle of fibers, the method comprising:
  the emitting of at least one incident beam formed of pulses with a given wavelength at a first spatial light modulator arranged in the object focal plane of a first lens forming with a second lens an optical layout with an intermediate focal plane;
  the formation by means of the first spatial light modulator from the incident light beam of a number N of elementary light beams each of which is intended to enter into one of said optical fibers, each elementary beam passing into a given waveplate arranged in the intermediate focal plane of the optical layout, such that the sum of the delay introduced by said waveplate and the relative group delay of the optical fiber intended to receive said elementary light beam is minimal in absolute value;
  the deviating by means of a second spatial light modulator arranged in the image focal plane of the second lens of each of the N elementary light beams such that each elementary light beam penetrates into the corresponding optical fiber perpendicularly to the entrance face of the optical fiber.

According to a fourth aspect, one or more embodiments concern a method of lensless nonlinear endo-microscopic imaging by means of a bundle of monomode optical fibers arranged in a given pattern and each one characterized by a relative group delay defined relative to the travel time of a pulse propagating in a reference monomode optical fiber of the bundle of fibers, the method comprising:
  the emitting of at least one incident beam formed of pulses with a given wavelength and the formation from said incident beam and by means of waveplates of a number M of light beams, each of the M light beams being formed of pulses characterized by a given group delay,
  the formation by means of a first spatial light modulator arranged in the object focal plane of a first lens and from the M light beams of a number N of elementary light beams each of which is intended to enter into one of said optical fibers, such that the sum of the delay of the light beam from which is formed the elementary light beam so introduced and the relative group delay of the optical fiber intended to receive said elementary light beam is minimal in absolute value;

the deviating by means of a second spatial light modulator arranged in the image focal plane of the lens of each of the N elementary light beams such that each elementary light beam penetrates into the corresponding optical fiber perpendicularly to the entrance face of the optical fiber.

Advantageously, the relative group delays of the monomode optical fibers of the fiber bundle are characterized at the wavelength of the pulses forming the incident light beam.

According to one or more sample embodiments, the one and/or the other of the spatial light modulators makes possible the application of a phase shift to each of the elementary beams, making it possible to imprint at the distal end of the bundle of fibers a predetermined phase function and/or to correct the phase variations introduced by each of the fibers of the bundle of fibers.

According to one or more sample embodiments, especially for applications in nonlinear imaging in which pulses at different wavelengths are made to interact, the method involves the emitting of incident light beams formed of pulses with distinct wavelengths. In this or these sample embodiments, the first spatial light modulator furthermore allows a distributing of the elementary light beams into distinct and identifies subsets of fibers of the bundle of fibers, each subset of fibers being intended to receive the light beams formed of pulses with a given wavelength.

The methods of nonlinear endo-microscopic imaging specified in the present description apply to every type of nonlinear imaging, and especially the generation of two-photon fluorescence and auto-fluorescence, the generation of n-photon fluorescence and auto-fluorescence, the generation of a second harmonic, the generation of a third harmonic, the generation of an n-th harmonic, the generation of the sum and difference of frequencies, the generation of a coherent Raman signal, the generation of transitory absorption signals, the transitory index modification.

BRIEF DESCRIPTION OF THE DRAWINGS

Other advantages and characteristics of the invention will appear from the perusal of the description, illustrated by the following figures.

DETAILED DESCRIPTION

In the figures, the identical elements are indicated by the same references.

Figure 1A:
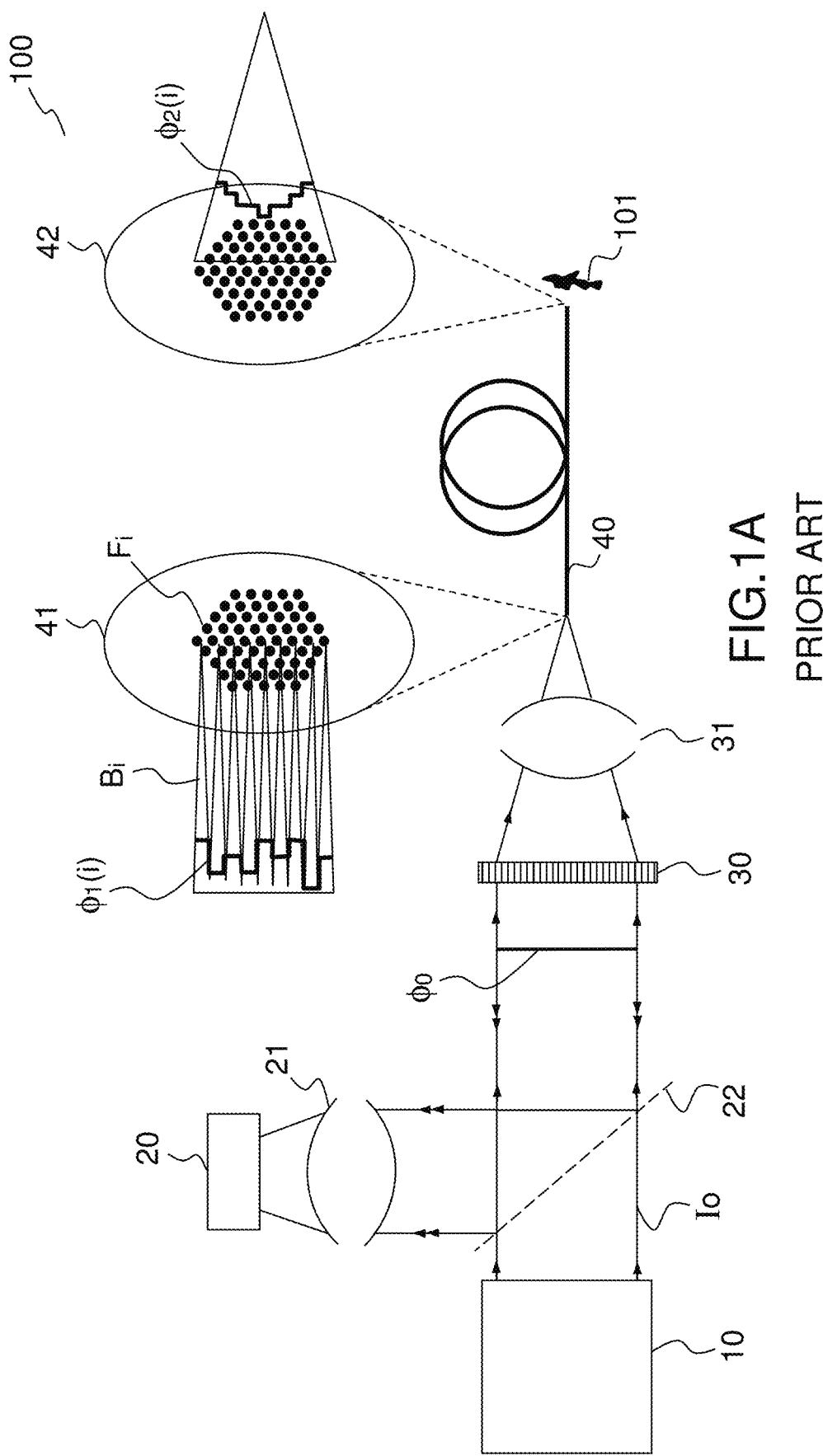
FIGS. 1A and 1B (already described), a schematic diagram of a so-called "lensless" endoscope based on the use of a bundle of monomode fibers and a diagram illustrating the problems of group delay in the fibers in the case of ultrashort pulses.
Figure 1B:
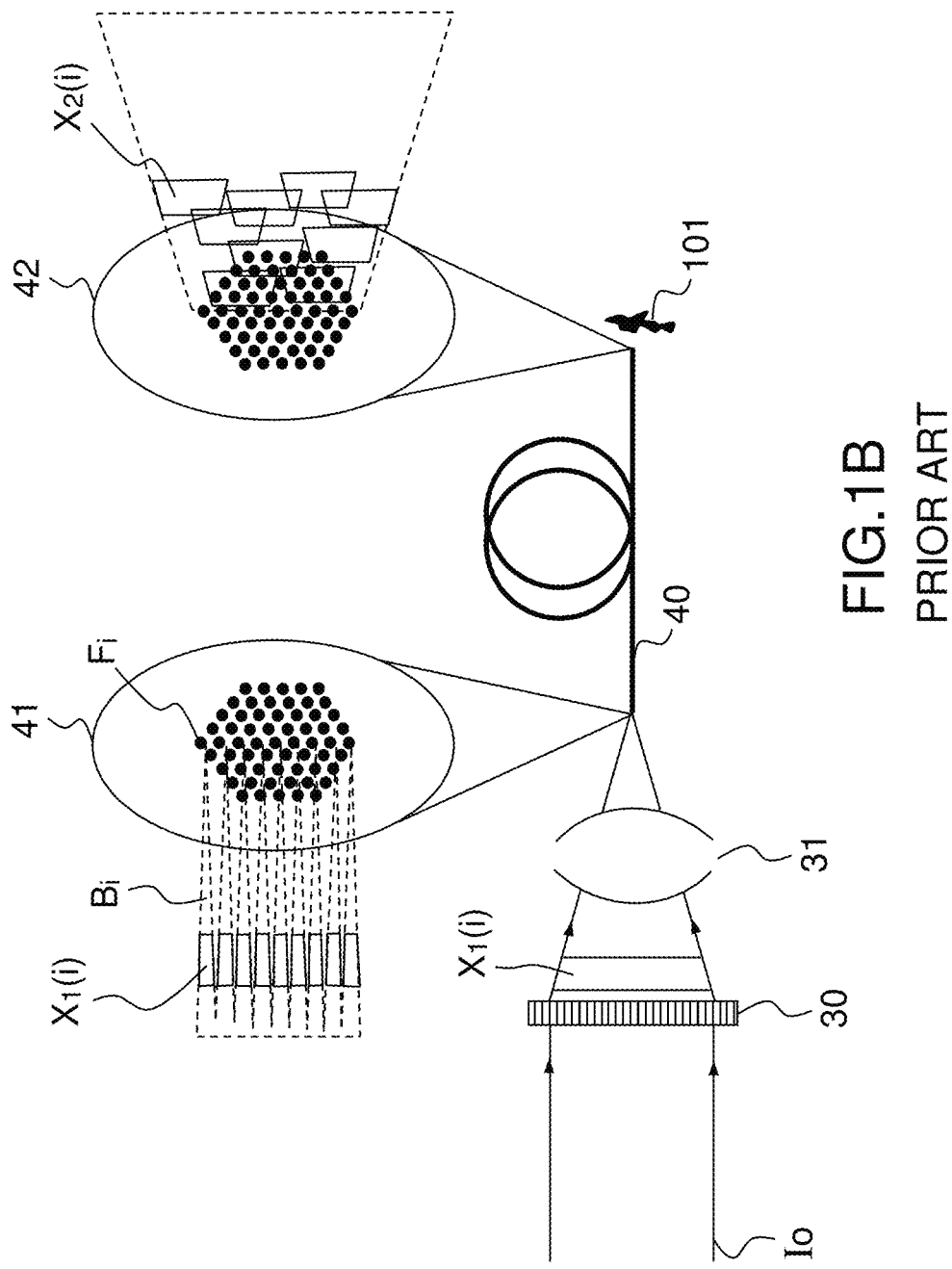
Figure 2A:
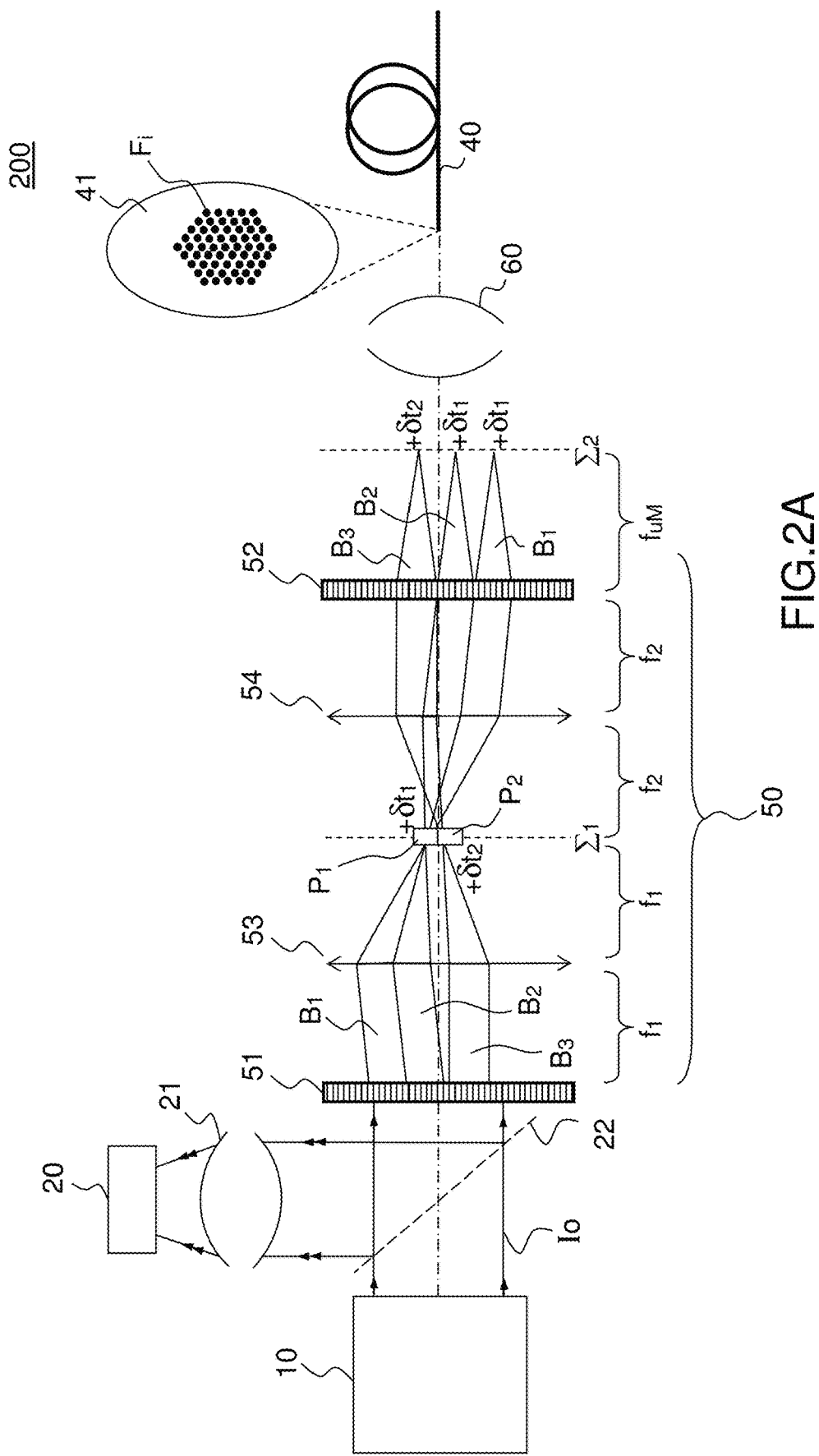
FIGS. 2A and 2B, diagrams illustrating an example of a lensless endo-microscopic imaging system according to the present description.
Figure 2B:
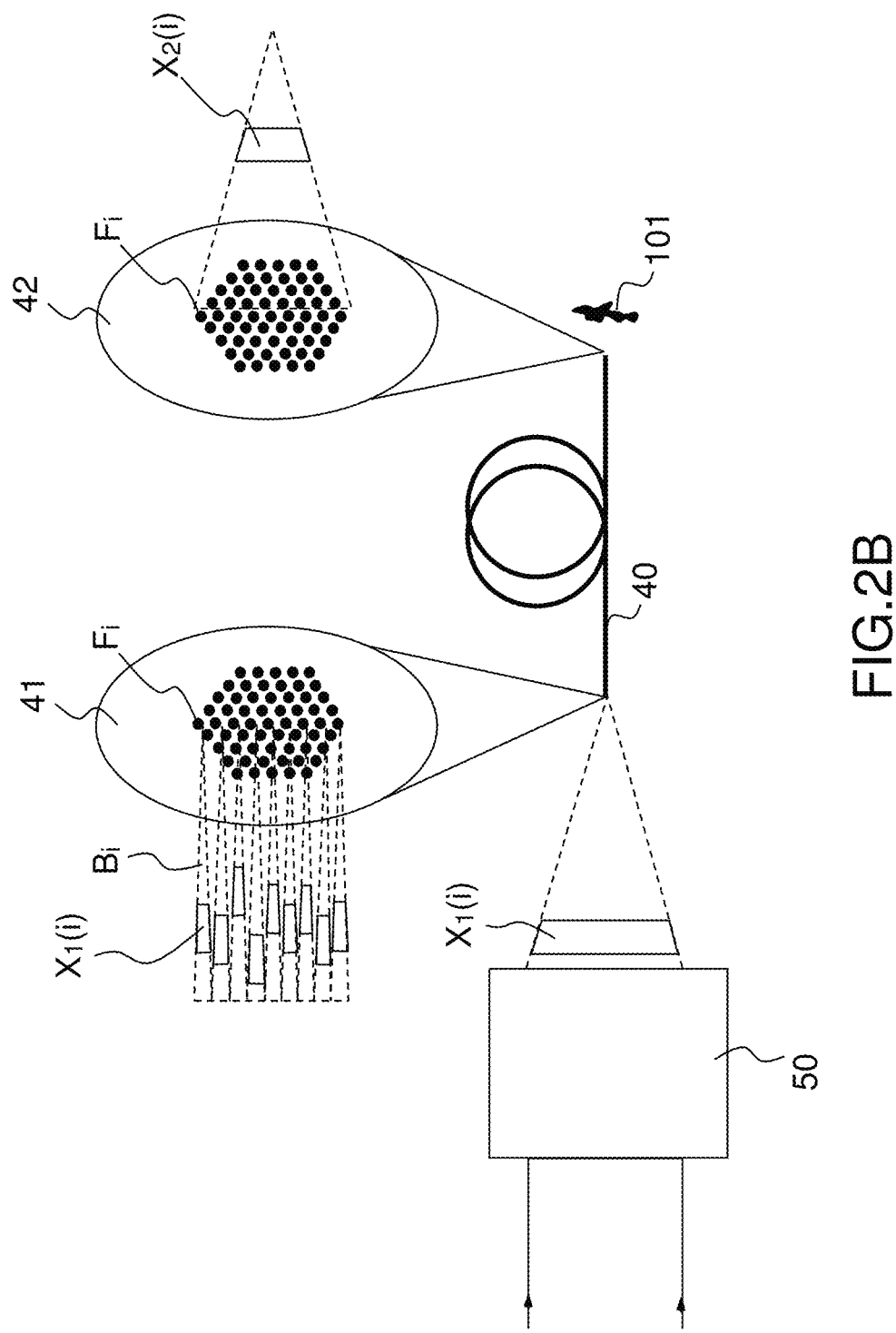

FIGS. 2A and 2B illustrate schematically a system 200 of "lensless" endo-microscopic imaging according to the present description as well as the principle of its implementation.

The system 200 generally comprises an emission path, with a light source 10 for the emitting of ultrashort light pulses $I_0$, typically less than a picosecond, for example between 100 femtoseconds and a picosecond, and a detection path adapted to detect the light intended to pass through the bundle of monomode optical fibers 40 from its distal end to its proximal end. The light detected is, for example, the light coming from the nonlinear process in the specimen after excitation. The detection path comprises a lens 21 and a detector 20 and it is separated from the emission path by a separating plate 22, such as a dichroic plate in the case of nonlinear imaging applications in which the detection wavelength (for example, two-photon fluorescence) is different from the emission wavelength.

The system 200 likewise comprises a device for transporting and controlling the light pulses. According to the present description, the device for transporting and controlling the light pulses comprises an optical device 50 to control the group velocity, or a group delay control (GDC) device, a bundle of N monomode optical fibers $F_i$, referenced 40, and advantageously an optical system 60 of the telescope type, making it possible to adapt the dimensions of the beam coming from the optical device for control of the group velocity 50 at the entrance face 41 of the bundle of fibers 40. In the example of FIG. 2A, the detection path is represented between the light source 10 and the GDC 50. The detection path could also be found between the GDC 50 and the bundle of fibers 40, for example, between the GDC 50 and the telescope 60.

The N monomode optical fibers $F_i$ of the bundle of fibers 40 are arranged in a given pattern. In the example shown in FIGS. 2A and 2B, the monomode optical fibers $F_i$ are arranged in periodic manner; each fiber $F_i$ forms for example the core of a multi-core fiber or "MCF". The bundle of optical fibers 40 comprises an entrance face 41 situated at the proximal side, that is, the side intended to receive an incident luminous flux, and an exit face 42 situated at the distal side, that is, the side intended to emit an outgoing light beam for the illumination of an object of analysis 101.

Each optical fiber $F_i$ of the bundle of fibers is characterized by a relative group delay $\Delta x_i$ defined by the difference in the time it takes for an elementary beam $B_i$ formed by a light pulse to move through the fiber $F_i$ and the time it takes for an elementary beam formed from the same light pulse to move through a reference fiber $F_0$ chosen arbitrarily in the bundle of fibers. The relative group delays $\Delta x_i$ thus describe the relative delays of the light pulses propagating in the optical fibers $F_i$. The characterization of the relative group delays may be done by methods of characterization which are known and which shall be described in further detail below.

According to the present description and as illustrated in general manner in FIG. 2B, the optical device for group velocity control GDC (50) is disposed at the proximal end of the bundle of monomode optical fibers 40 and is designed to reduce, at the distal end of the bundle of optical fibers, the relative discrepancy between the different elementary beams $B_i$. Thus, the optical device for group velocity control 50 according to the present description is adapted to introducing, in the area of each elementary beam $B_i$ which is intended to enter into a monomode optical fiber $F_i$ of the bundle of fibers 40, a group delay which will compensate at least in part for the group delay $\Delta x_i$ characterizing the fiber $F_i$, such that the relative group delays in the different elementary beams leaving the bundle of fibers 40 are close to zero and at least less than half the duration of the pulses intended to propagate in the bundle of fibers. As shown in FIG. 2B, the group velocity control $X_1(i)$ of the proximal end of the bundle of fibers results in a substantially constant distribution of the group velocities $X_2(i)$ at the distal end.

FIG. 2A illustrates a first sample embodiment of an optical device for group velocity control GDC according to the present description.

The optical device for group velocity control 50 in this example comprises a first lens 53 characterized by a focal distance $f_1$ and a second lens 54 characterized by a focal distance $f_2$. The lenses 53 and 54 are defined by any suitable optical system, for example by using lenses and/or mirrors. The first and second lenses 53, 54 are arranged to form an optical layout with an intermediate focal plane ($\Sigma_1$) coinciding with the image focal plane of the first lens 53 and the object focal plane of the second lens 54.

The optical device for group velocity control 50 furthermore comprises a given number M of waveplates $P_j$, advantageously between 2 and 20 plates, spatially distributed in a plane, this plane being, in the example of FIG. 2A, the intermediate focal plane ($\Sigma_1$). Each plate is designed to allow the introducing of a given delay $\delta t_j$.

The velocity control device GDC also comprises a first spatial light modulator 51 adapted to form, from an incident beam formed by pulses $I_0$ emitted by the light source 10, a number N of elementary light beams $B_i$ intended to enter into each of the N optical fibers $F_i$ of the bundle of fibers 40. In the example of FIG. 2A, the first spatial light modulator 51 is located in an object focal plane of the first lens 53 and is designed to imprint on each elementary beam $B_i$ a deviation such that each elementary beam $B_i$ passes into the appropriate waveplate $P_j$. The appropriate waveplate $P_j$ is the one which imprints a delay $\delta t_j$ such that the sum of the delay $\delta t_j$ introduced by the waveplate $P_j$ and the relative group delay $\Delta x_i$ of the optical fiber $F_i$ which is intended to receive said elementary light beam $B_i$ is close to zero, regardless of the optical fiber $F_i$ or at least less than half the pulse duration. In practice, the number M of waveplates is much less than the number N of monomode optical fibers in the bundle of fibers 40 (for example, a multi-core fiber) and a large number of elementary beams $B_i$ will be imprinted with the same delay. One then seeks to minimize the variance of the histogram of all the values ($\delta t_j + \Delta x_i$) where $\delta t_j$ is the delay applied to the elementary beam $B_i$ which is intended to pass through the fiber $F_i$ characterized by a group delay $\Delta x_i$, such as will be illustrated by way of an example below.

The velocity control device 50 according to the present description likewise comprises a second spatial light modulator 52 adapted to deviating each of the N elementary light beams $B_i$ such that each elementary light beam $B_i$ penetrates into the corresponding optical fiber $F_i$ perpendicularly to the entrance face of the optical fiber. In the example of FIG. 2A, the second spatial light modulator 52 is located in an image focal plane of the second lens 54 and makes it possible to compensate for the deviation introduced into each elementary beam $B_i$ by the first spatial light modulator 51.

In the simplified diagram of FIG. 2A, three elementary beams $B_1$, $B_2$, $B_3$ are thus represented. These beams are formed from an incident beam at the first spatial light modulator 51, the incident beam being formed of pulses $I_0$ emitted by the light source 10. The beams $B_1$ and $B_2$ intended to enter into the optical fibers $F_1$ and $F_2$ (not shown) of the bundle of fibers 40, characterized by the group delays $\Delta x_1$ and $\Delta x_2$, are deviated by the first spatial light modulator 51 and focused by the first lens 53 so as to pass through a waveplate $P_1$ characterized by a delay $\delta t_1$, whereas the beam $B_3$ intended to enter into the optical fiber $F_3$ (not shown) of the bundle of fibers 40, characterized by a group delay $\Delta x_3$, is deviated by the first spatial light modulator 51 and focused by the first lens 53 to move through a waveplate characterized by a delay $\delta t_2$. The elementary beams $B_1$, $B_2$, $B_3$ are then sent by means of the second lens 54 to the second spatial light modulator 52 which imprints a deviation that compensates for the deviation imprinted by the first spatial light modulator 51 so that the elementary beams each exit with an optical axis perpendicular to the entrance face 41 of the bundle of fibers 40. The beams $B_1$, $B_2$, $B_3$ are formed of light pulses respectively having delays $\delta t_1$, $\delta t_1$, $\delta t_2$ and which, after moving through the monomode optical fibers $F_1$, $F_2$, $F_3$ will have zero or reduced relative differences in the group velocity.

In the example of FIG. 2A, the elementary beams $B_i$ at the exit of the second spatial light modulator 52 are focused in a focal plane $\Sigma_2$ and an optical system 60 of telescope type makes it possible to apply a magnification absolutely less than 1 to adapt all of the focusing points formed in the focal plane $\Sigma_2$ to the pattern formed by the fibers $F_i$ in the area of the entrance face 41 of the bundle of fibers 40.

According to one variant, the focusing of the elementary beams $B_i$ at the exit of the second spatial light modulator 52 in the focal plane $\Sigma_2$ is provided by the spatial light modulator 52 which introduces a parabolic phase into each elementary beam $B_i$. Alternatively, the velocity control device 50 may comprise, at the output of the second spatial light modulator 52, an optical element (not shown), such as an array of microlenses, which can ensure the focusing of each elementary beam.

The velocity control device 50 as described by means of FIGS. 2A and 2B thus makes possible, in simple fashion, a control of the group velocity for each of the monomode optical fibers $F_i$ of the bundle of fibers 40.

Of course, this velocity control device, or GDC, may well be used to compensate for phase delays which have previously been characterized on the fibers of the fiber bundle and/or to imprint on each elementary beam a phase function which will allow the forming of the sought phase at the distal end of the bundle of fibers 40, for example, a parabolic function for the formation of a focus point.

In the example of FIG. 2A, these functions could be provided by the one and/or the other of the first and second spatial light modulators 51, 52.

In the example of FIG. 2A, the first and/or the second spatial light modulator could be formed by a base modulator with segmented deformable mirrors or membranes, operating by reflection, or by a liquid crystal matrix able to operate by reflection or by transmission.

FIGS. 3 to 6 show initial experimental results obtained with an imaging system as is described in FIG. 2A and allowing a validation of the method according to the present description.

In this example, the light source is a femtosecond laser, emitting pulses of 150 fs at a wavelength of 1.035 µm. The device for transporting and controlling of the pulses comprises a bundle of monomode optical fibers formed here by a multi-core fiber.

Figure 3A:
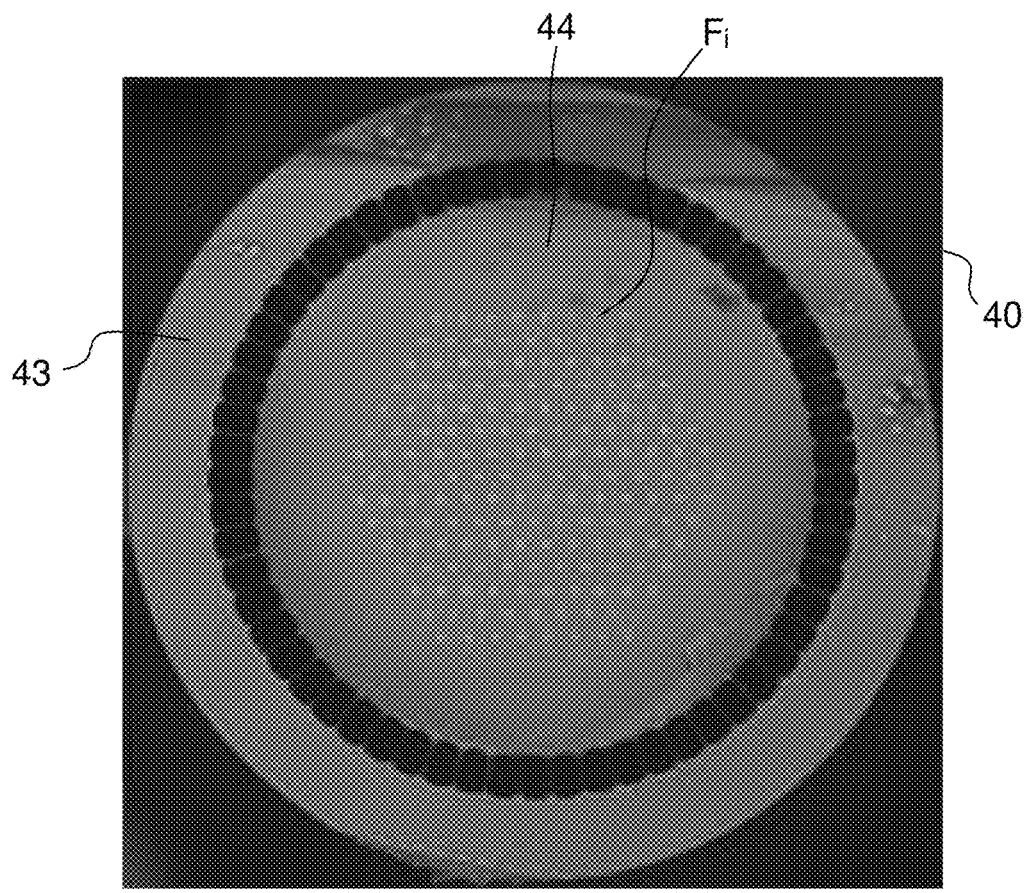
FIGS. 3A to 3D, figures illustrating an example of a multi-core optical fiber and its characterization by the implementing of a method of lensless endo-microscopic imaging according to the present description.
Figure 3B:
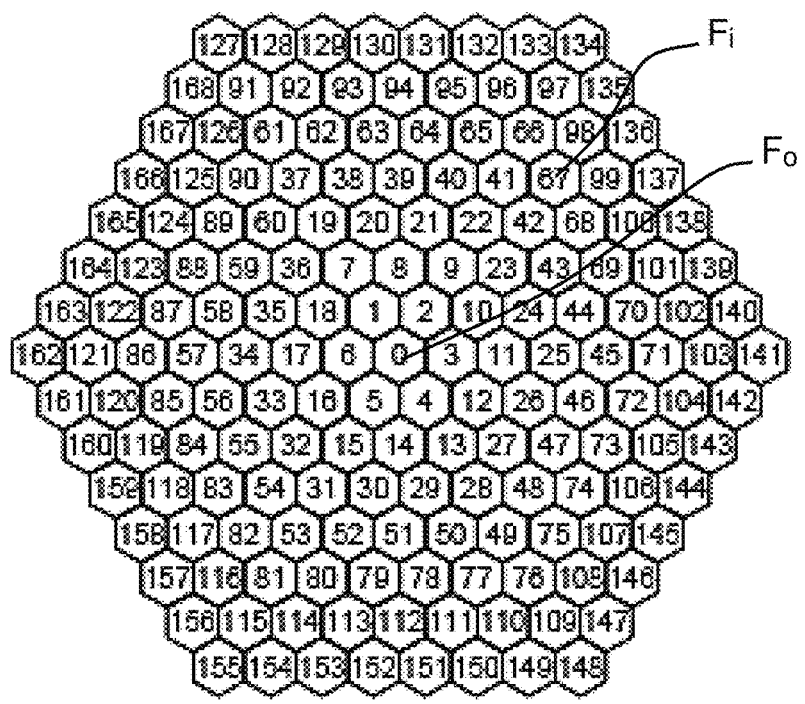

La multi-core fiber 40 used is illustrated in FIG. 3A. It comprises a group of 169 monomode cores $F_i$ arranged in periodic manner and referenced from a central fiber $F_0$, as is shown in FIG. 3B. Each monomode core $F_i$ is intended to receive at its proximal end an elementary beam $B_i$ which passes through the core to exit at a distal end, as previously explained. The central core $F_0$ forms the reference monomode fiber for the determination of the group delay $\Delta x_i$ characterizing each monomode core $F_i$. The multi-core fiber likewise comprises an internal multimode sheath 44 adapted to collecting the light signal from the distal end to the proximal end. In the example shown in FIG. 3A, the distance between cores is 11.8 µm, the diameter of a mode in each monomode core is 3.6 µm and the corresponding divergence is 0.12 radians; the diameter of the interior multimode sheath 44 is 250 µm. The coupling measured between one monomode core $F_i$ and its closest neighbor is less than −25 dB, even with a curvature applied to the multi-core fiber of 12.5 cm radius.

Figure 3C:
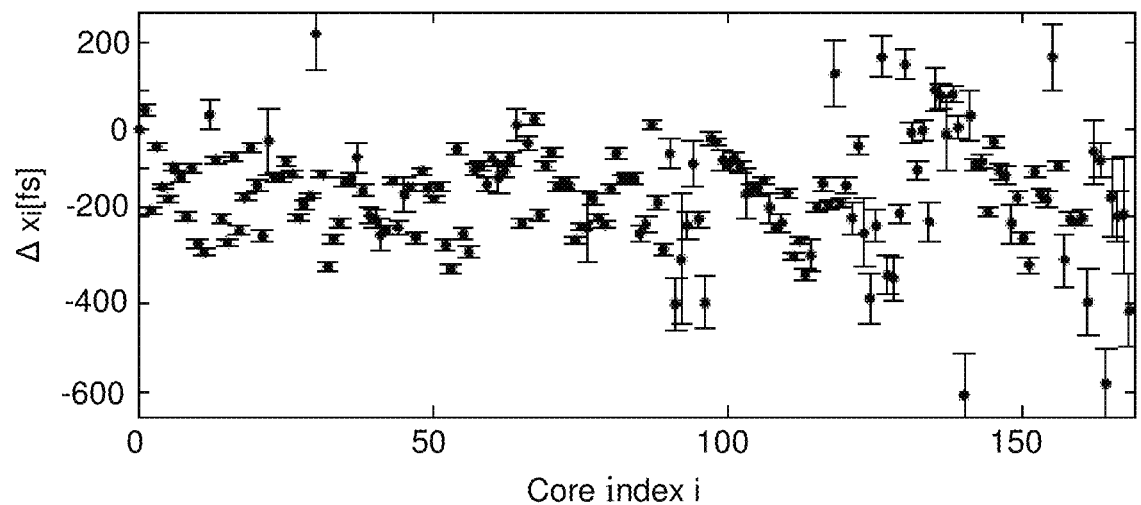
Figure 3D:
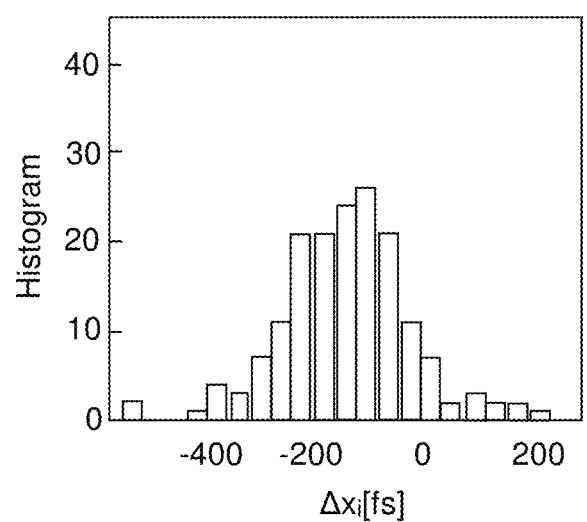
Figure 9:
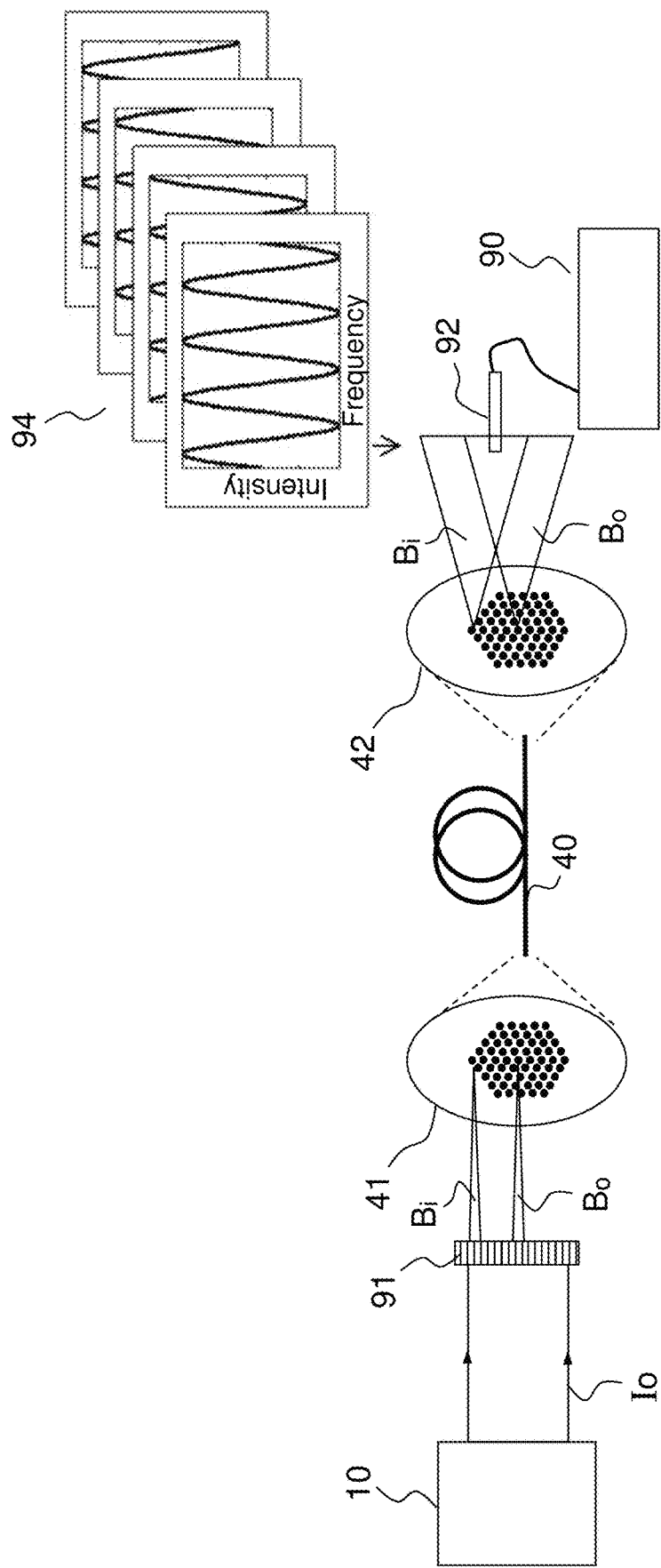
FIG. 9, a set of diagrams illustrating a method of distal measurement of the group delays in a bundle of monomode fibers.
Figure 10:
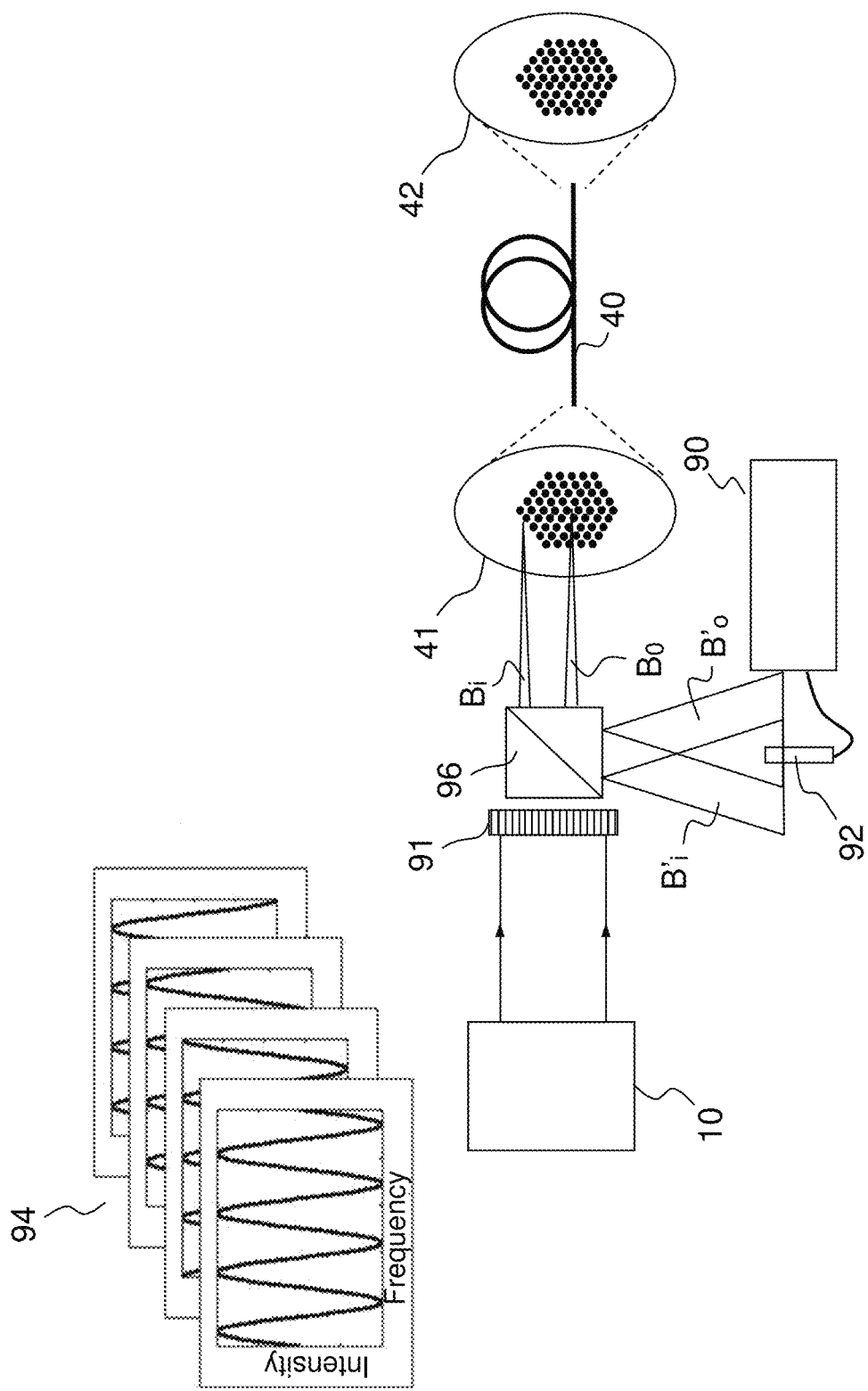
FIG. 10, a set of diagrams illustrating a method of proximal measurement of the group delays in a bundle of monomode fibers.

A characterization of the relative group delays of each of the monomode cores of the multi-core fiber 40 is carried out with the help of a known method, such as a method described by means of FIGS. 9 and 10. FIG. 3C thus represents the relative group delays $\Delta x_i$ measured for the cores of index i of the multi-core fiber. The group delay is defined as the difference between the time it takes for a light pulse to pass through the fiber $F_i$ and the time it takes for an identical light pulse to pass through the reference fiber $F_0$. FIG. 3D shows the histogram of all the group delay values.

As described with the aid of FIG. 2A, the velocity control device 50 makes it possible to partition the N elementary beams intended to enter into the N monomode cores of the multi-core fiber 40 into M groups on which M delay values will be imprinted by means of M waveplates $P_j$.

The M waveplates $P_j$ are formed for example by means of M−1 glass plates of identical thickness, the plate of index j comprising j holes, each one able to let through a group of elementary beams; the M−1 plates are stacked in order to make up a delay plate comprising M zones able to imprint, on the elementary beams, M delays $\Delta t_j$. The holes can be made, for example, by laser ablation.

Figure 4:
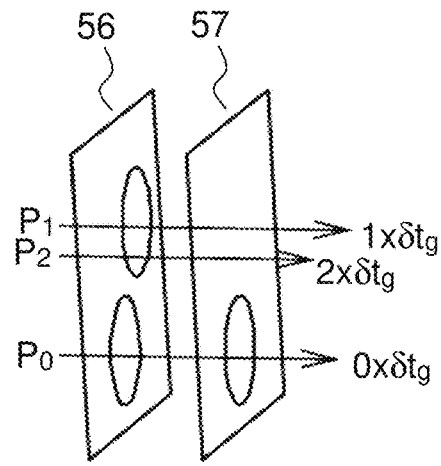
FIG. 4, a diagram illustrating an example of waveplates for the implementing of a method of lensless endo-microscopic imaging according to the present description.

Thus, FIG. 4 illustrates the realization of 3 waveplates $P_1$, $P_2$, $P_3$ by means of 2 plates 56, 57 of substantially equal thickness, plate 56 having 2 holes and plate 57 only one hole, the plates being disposed so as to form 3 zones defining the 3 waveplates and which will imprint respectively delays of $0 \times \delta t_g$, $1 \times \delta t_g$, $2 \times \delta t_g$, where $\delta t_g$ is the delay introduced by a pulse passing through a plate.

The waveplates may also be formed by any other known means. For example, there may be M glass bars of equal diameter but different length. Each bar is able to let through a group of elementary beams. The bars are arranged, for example, opposite each other, making it possible to imprint, on the elementary beams, M delays $\delta t_j$. The length of a bar may be controlled, for example, by polishing. The waveplates may also be formed from a glass plate which is divided into M zones; by a method of micro-fabrication, each of the zones is hollowed out to form M zones of different thickness. The micro-engraving may be a dry engraving (Reactive Ion Etching) or a wet engraving (HF) or it may use a focused ion beam.

As for the spatial light modulators, the waveplates can operate either by transmission or by reflection.

Turning back to the example of FIGS. 3 to 6, each of the N elementary beams $B_i$ will thus pass through one of the 3 waveplates $P_1$, $P_2$, $P_3$, depending on the value of the relative group delay $\Delta x_i$ of the fiber $F_i$ which it is intended to pass through. Since M is much smaller than N, a large number of elementary beams $B_i$ will be imprinted with the same delay in the intermediate focal plane $\Sigma_1$.

Figure 5A:
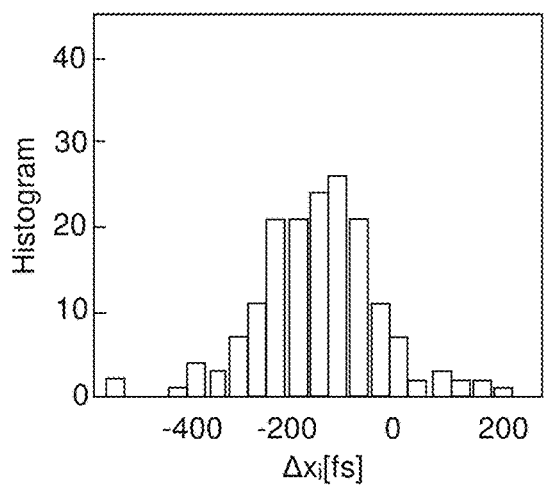
FIGS. 5A and 5B, diagrams illustrating respectively the dispersion of the group delays in the multi-core fiber represented in FIG. 3A, before and after implementing a method of endo-microscopic imaging according to the present description.
Figure 5B:
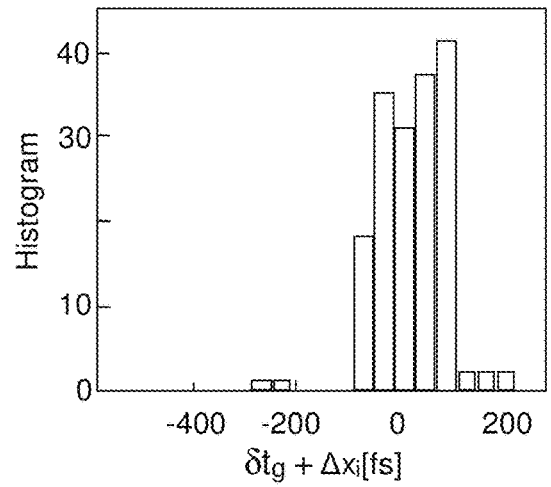

FIGS. 5A and 5B show by histograms all of the values of the relative group delays in a case where there is no group velocity control device (FIG. 5A) and in the case where the group velocity control device is present (FIG. 5B). One observes a clear decrease in the variance from one histogram to the other, and this already with 3 plates introducing 3 distinct delay values.

Figure 6:
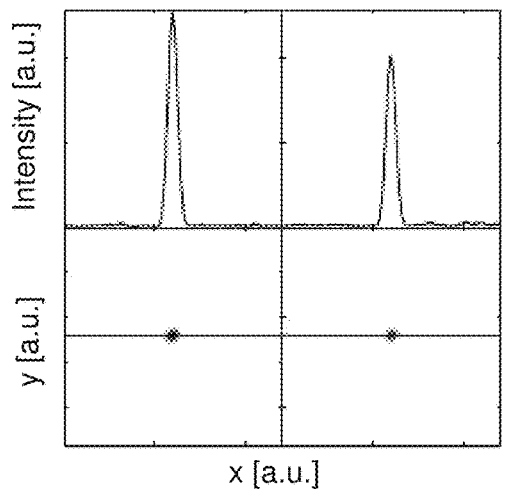
FIG. 6, first experimental results comparing the spatial appearance of the focal point at the exit of a multi-core fiber as represented in FIG. 3A with or without application of a method of endo-microscopic imaging according to the present description.

FIG. 6 shows the spatial appearance of a focal point at the exit from the multi-core fiber with application of the method for control of the group velocity (at left) and without application of that method (at right). In the bottom figures there is shown the image of the focal point, and in the top figures the spatial distribution of the intensity. Here again, these initial experimental results show the gain in intensity achieved thanks to the method according to the present description.

Figure 7:
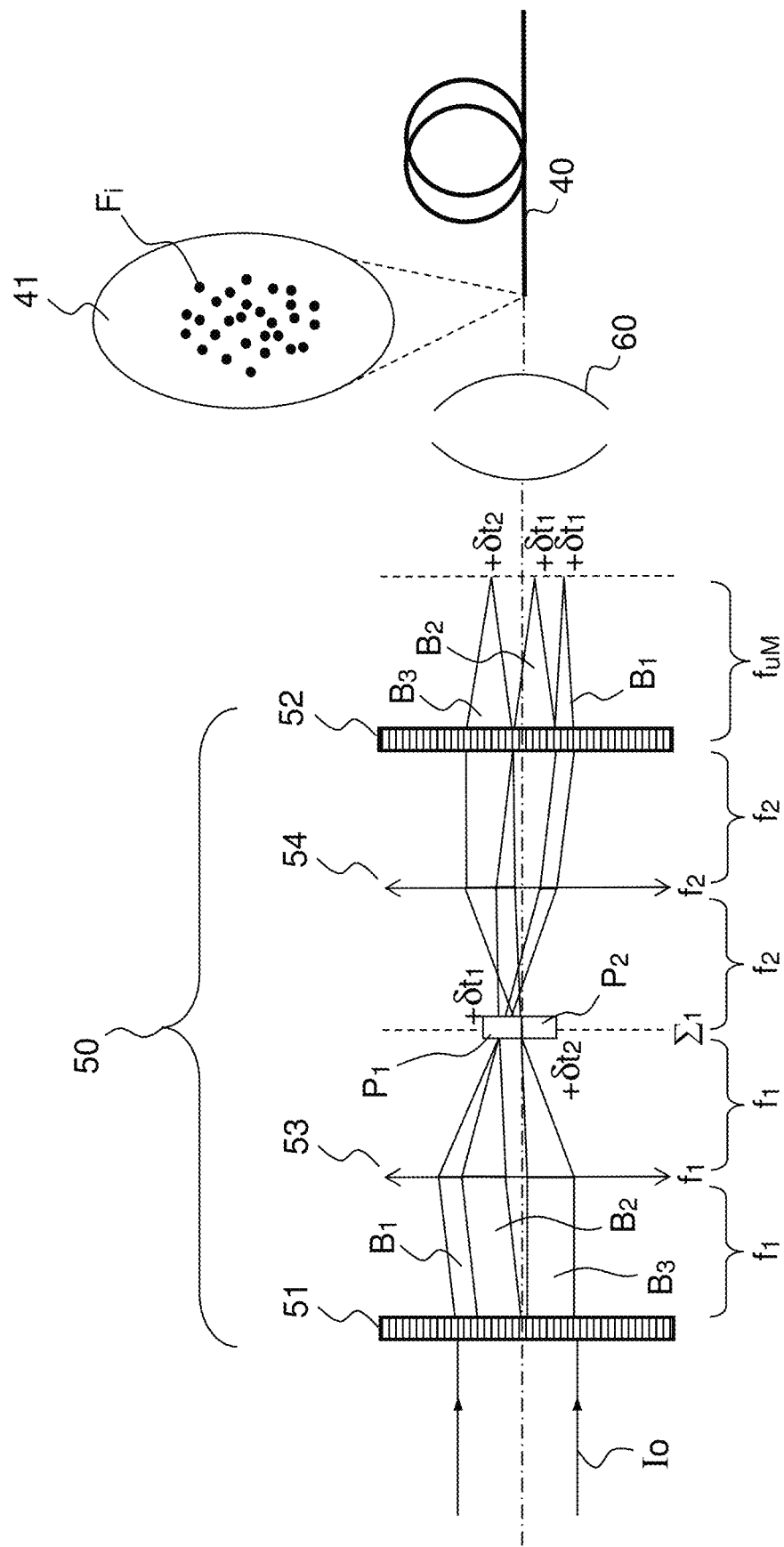
FIG. 7, a diagram illustrating an example of a system of "lensless" endo-microscopic imaging according to another example of the present description.

FIG. 7 shows a diagram of one example of a system of lensless endo-microscopic imaging according to another example of the present description.

This example is identical to that of FIG. 2A, but it shows the case of an aperiodic arrangement of the monomode optical fibers in the bundle of fibers 40. One observes that the device and the method for transporting and controlling of pulses according to the present description apply just as well to a bundle of fibers having fibers arranged in aperiodic manner.

Figure 8A:
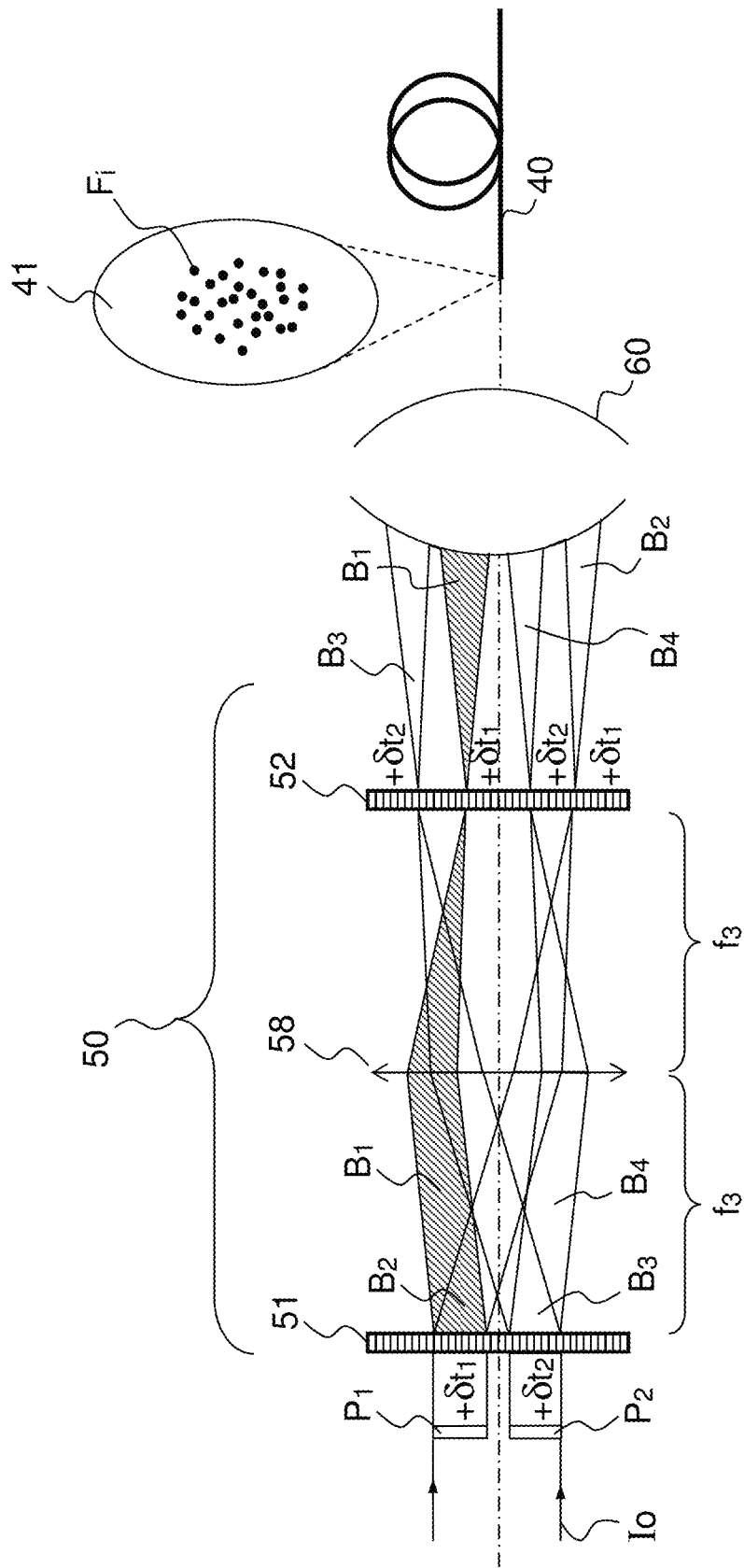
FIGS. 8A and 8B, diagrams illustrating examples of a system of "lensless" endo-microscopic imaging according to other examples of the present description.

FIG. 8A illustrates a diagram of an example of a system of lensless endo-microscopic imaging according to another example of the present description.

In the diagram described in FIG. 8A, one takes advantage of the fact that M<<N to first of all realize a differential delay between M subportions of the collimated incident beam. In FIG. 8A, the collimated incident beam is subdivided into M=2 subportions having a delay $\delta t_1$ or $\delta t_2$. This delay may advantageously be realized by a micro-structured plate, as previously described. It is then a matter of assigning, in the N fibers of the bundle of optical fibers, an elementary sub-beam with the chosen delay, here, $\delta t_1$ or $\delta t_2$. In this example, the first spatial light modulator 51 advantageously comprises a liquid crystal matrix. For example, one utilizes the additive property of holograms which consists in generating, at M zones of the first spatial light modulator 51, a set of holograms able to diffract the incident beam corresponding to the delay $\delta t_i$ in different directions. These different directions appear as focus points in the plane of the second spatial light modulator 52 and the latter produces a deviation such that each elementary light beam penetrates perpendicularly at the entrance face of the optical fiber. The holograms formed in the area of each of the M zones of the first spatial light modulator are, for example, computer-generated holograms or "CGH". Such holograms are described, for example, in Liesener et al., "Multi-functional optical tweezers using computer-generated holograms", Opt. Commun., 185, 77 (2000).

Figure 8B:
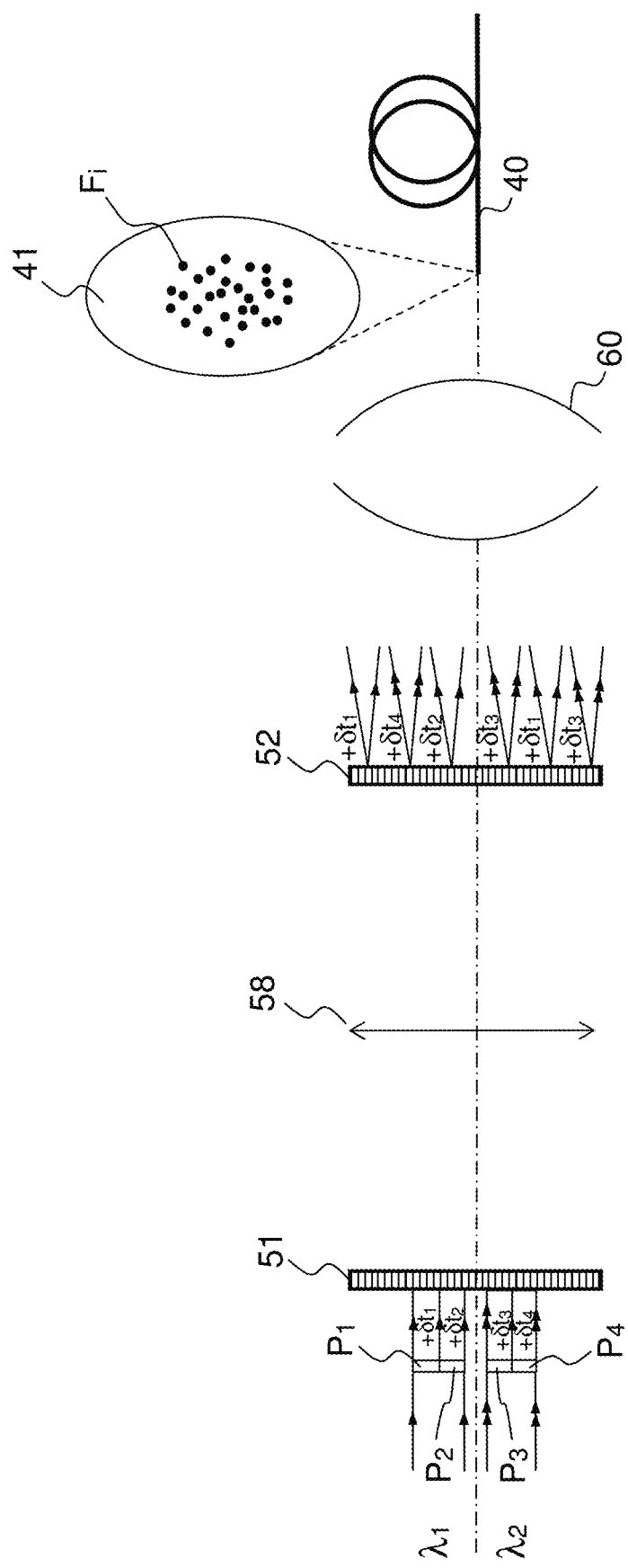

FIG. 8B illustrates a diagram of an example of a system of lensless endo-microscopic imaging similar to that of FIG. 8A, but used in an application implementing pulses of two wavelengths, for example, for applications in two-beam nonlinear imaging.

According to this example, each fiber of the fiber bundle 40 is intended to transport an elementary beam at a given wavelength and the relative group delay of this fiber is advantageously characterized at this wavelength. In this example, the first spatial light modulator 51 moreover enables a distribution of the elementary light beams formed from pulses of a given wavelength into an identified subset of the fibers of the fiber bundle 40.

In the example illustrated in FIG. 8B, the beam at the first wavelength $\lambda_1$, indicated by single arrows, passes for example through two waveplates $P_1$, $P_2$ characterized by respective delays $\delta t_1$ and $\delta t_2$ and the beam at the second wavelength $\lambda_2$, indicated by the double arrows, passes through two waveplates $P_3$, $P_4$ characterized by respective delays $\delta t_3$ and $\delta t_4$. As in the example of FIG. 8A, the first spatial light modulator 51 makes it possible to form N elementary beams, each elementary beam of given wavelength being characterized by a delay introduced by the plate through which it passes and intended to enter into a previously identified optical fiber of the fiber bundle de. For example, N/2 fibers of the fiber bundle receive elementary beams at the first wavelength $\lambda_1$, whereas the remaining N/2 fibers of the fiber bundle receive elementary beams at the second wavelength $\lambda_2$. In the example illustrated in FIG. 8B, six elementary beams are shown, three of them at the wavelength $\lambda_1$ and three at the wavelength $\lambda_2$. For example, these two groups of fibers are chosen such that the fibers transporting $\lambda_1$ and $\lambda_2$ are interlaced at the proximal face of the bundle of fibers. In the example illustrated in FIG. 8B, the interlacing is illustrated by the fact that, downstream from SLM2, the elementary beams alternate between $\lambda_1$ and $\lambda_2$.

FIGS. 9 and 10 illustrate examples of the method for the characterization of the relative group delays in a bundle of fibers 40 of a device for transporting and controlling of light pulses according to the present description, for example for the characterization of a multi-core fiber. These methods are based on the known techniques of spectral interferometry (see, for example, Lepetit et al., "Linear techniques of phase measurement by femtosecond spectral interferometry for applications in spectroscopy", J. Opt. Soc. Am. B, 12(12), 2467 (1995)). FIG. 9 illustrates a method suitable for a distal measurement of group delays, while FIG. 10 illustrates a method suitable for a proximal measurement of group delays, in which it is not necessary to have access to the distal end of the bundle of fibers.

As illustrated in FIG. 9, the method for the characterization of the group delays implements a fiber spectrometer 90 and a spatial light modulator 91. The measurement of the relative group delay $\Delta x_i$ of a fiber Fi, defined with regard to the travel time of a pulse propagating in a reference fiber $F_0$, comprises the following steps. Only the elementary beams $B_i$ and $B_0$ intended to enter into the optical fibers Fi, $F_0$ are formed. These pass through the optical fibers $F_i$ and $F_0$ respectively. Upon emerging from the bundle of fibers 40 at the distal end, $B_i$ and $B_0$ diverge and overlap spatially. In a plane where the overlapping is near total, an optical fiber 92 collects a portion of each beam. The optical fiber 92 relays the light collected to the spectrum analyzer 90. The spectrum comprises a sinusoidal modulation (curves 94), whose period is equal to $(\Delta x_i)^{-1}$; thus, one deduces the sought value, $\Delta x_i$. In practice, in order to eliminate any background signal not coming from $B_i$ or $B_0$, the spectrum is measured by the principle of phase shift interferometry, where the phase of $B_i$ (with respect to $B_0$) is scanned by using the spatial light modulator 91, by the technique of phase shift interferometry (see, for example, Bruning et al., "Digital Wavefront Measuring Interferometer for Testing Optical Surfaces and Lenses", Appl. Opt. 13(11), 2693 (1976), equations (3-6)).

It is likewise possible to measure $\Delta x_i$ without having access to the distal portion of the bundle of fibers 40 as illustrated in FIG. 10. In fact, around 3% of $B_0$ and $B_i$ is reflected by the distal face of the bundle of fibers, due to the difference in indices of refraction at the interface between the bundle of fibers and air. The reflected beams $B'_0$ and $B'_i$, emerging from the proximal end of the bundle of fibers 40 may be routed to an optical fiber 92 by means of a separating plate 96 (such as a semi-reflecting plate or a polarization splitter cube). The measurement is done as previously described; in this case, one measures $(2\Delta x_i)^{-1}$ since the pulses make a round trip in the bundle of fibers.

Although described through a certain number of detailed sample embodiments, the device for transporting and controlling of light pulses for so-called "lensless" endo-microscopic imaging as well as the systems and methods of lensless endo-microscopic imaging encompass different variants, modifications and improvements which may appear in obvious manner to the person skilled in the art, it being understood that these different variants, modifications and improvements are within the scope of the invention, as defined by the following claims.

The invention claimed is:

1. A device for transporting and controlling light pulses having at least one first wavelength for lensless endo-microscopic imaging, comprising:
   a bundle of N monomode optical fibers arranged in a given pattern, configured to receive a light beam at a proximal end and to emit a light beam at a distal end, wherein for each monomode optical fiber a relative group delay value is defined relative to a travel time of a pulse propagating in a reference monomode optical fiber of the bundle of fibers,
   an optical device for group velocity control, disposed on the proximal side of the optical fibers bundle and comprising:
      a plurality of M waveplates, each waveplate configured to introduce a given delay;
      a first spatial light modulator configured to generate, from one or more incident light beams emitted by a light source, a plurality of N elementary light beams comprising optical pulses, wherein, in operation, each elementary beam of the plurality of elementary light beams passes into a waveplate among the waveplates and enters into one of the optical fibers such that the sum of the delay introduced by said waveplate and the relative group delay of the optical fiber is minimal in absolute value;
      a second spatial light modulator configured to deviate the elementary light beam such that the elementary light beam penetrates into the optical fiber, perpendicularly to the entrance face of the optical fiber; and
   a phase control device comprising means of programming one and/or the other of the spatial light modulators, wherein the means of programming are configured to apply a phase shift to each of the elementary beams to imprint at the distal end of the bundle of fibers a predetermined phase function and/or to correct the phase variations introduced by each of the fibers of the bundle of fibers.

2. The device for transporting and controlling light pulses according to claim 1, wherein the optical device for controlling the group velocity comprises a first lens and a second lens forming an optical layout with an intermediate focal plane and in which:
   the waveplates are disposed in the intermediate focal plane of the optical layout;
   the first spatial light modulator is located in an object focal plane of the first lens; and
   the second spatial light modulator is located in an image focal plane of the second lens.

3. The device for transporting and controlling light pulses according to claim 1, wherein the optical device for controlling the group velocity comprises a lens and in which:
   the waveplates are disposed in a plane situated upstream from the first spatial light modulator and are adapted to form, from an incident beam formed of pulses, M light beams, each light beam being formed of pulses characterized by a given group delay;
   the first spatial light modulator is arranged in the object focal plane of the lens and is intended to receive said M light beams; and
   the second spatial light modulator is located in an image focal plane of the lens.

4. The device for transporting and controlling light pulses according to claim 3, wherein the first spatial light modulator is formed from M holographic zones, each holographic zone being intended to receive one of said light beams formed of pulses characterized by a given group delay.

5. The device for transporting and controlling light pulses according to claim 1, wherein the bundle of N monomode optical fibers is formed by a multi-core fiber.

6. The device for transporting and controlling light pulses according to claim 1, wherein the N monomode optical fibers are arranged in aperiodic manner.

7. An endo-microscopic imaging system, comprising:
   a source of light pulses;
   a device for transporting and controlling the pulses emitted by said source according to claim 1; and
   a detection path for the light intended to pass through the bundle of monomode optical fibers from its distal end to its proximal end.

8. A method of nonlinear lensless endo-microscopic imaging by means of a bundle of monomode optical fibers arranged in a given pattern, wherein, for each monomode optical fiber a relative group delay value is defined relative to a travel time of a pulse propagating in a reference monomode optical fiber of the bundle of fibers, the method comprising:
   emitting, using a light source, an incident beam comprising optical pulses having at least one wavelength towards a first spatial light modulator arranged in an object focal plane of a first lens, wherein the first lens forms with a second lens an optical layout with an intermediate focal plane;
   generating, using the first spatial light modulator, from the incident light beam a plurality N of elementary light beams, wherein each elementary light beam of the plurality of elementary light beams passes into a given waveplate configured to introduce a given delay and arranged in the intermediate focal plane of the optical layout, and enters into one of the optical fibers such that the sum of the delay introduced by said waveplate and the relative group delay of the optical fiber is minimal in absolute value;
   deviating, using a second spatial light modulator arranged in an image focal plane of the second lens, the elementary light beam such that the elementary light beam penetrates into the optical fiber perpendicularly to the entrance face of the optical fiber;
   applying a phase shift to each of the elementary beams, using one or the other of the first and second spatial light modulators, to imprint at the distal end of the bundle of fibers a predetermined phase function and/or to correct the phase variations introduced by each of the fibers of the bundle of fibers.

9. A method of nonlinear lensless endo-microscopic imaging by means of a bundle of monomode optical fibers arranged in a given pattern, wherein, for each monomode optical fiber a relative group delay value is defined relative to a travel time of a pulse propagating in a reference monomode optical fiber of the bundle of fibers, the method comprising:
   emitting, using a light source, an incident beam comprising optical pulses having at least one wavelength and generating, from said incident beam and using a plurality of M waveplates, wherein each waveplate of the plurality of waveplates introduces a given delay, a plurality of M of light beams, each of the M light beams pulses characterized by a given group delay,
   generating, using a first spatial light modulator arranged in an object focal plane of a first lens and from the M light beams, a plurality N of elementary light beams, wherein each elementary light beams is intended to enter into one of said optical fibers, such that the sum of the delay of the light beam from which is generated the elementary light beam and the relative group delay of the optical fiber is minimal in absolute value;
   deviating, using a second spatial light modulator arranged in an image focal plane of the first lens, the elementary light beam such that the elementary light beam penetrates into the optical fiber perpendicularly to the entrance face of the optical fiber;
   applying a phase shift to each of the elementary beams, using one or the other of the first and second spatial light modulators to imprint at the distal end of the bundle of fibers a predetermined phase function and/or to correct the phase variations introduced by each of the fibers of the bundle of fibers.

10. The method of nonlinear lensless endo-microscopic imaging according to claim 8, comprising:
   emitting at least two incident light beams comprising pulses having different wavelengths, wherein the first spatial light modulator furthermore allows a distributing of the elementary light beams formed of pulses having the same wavelength into a subset of fibers of the bundle of fibers.

11. The method of nonlinear lensless endo-microscopic imaging according to claim 9, comprising:
   emitting at least two incident light beams comprising pulses having different wavelengths, wherein said first spatial light modulator furthermore of distributes the elementary light beams formed of pulses having the same wavelength into a subset of fibers of the bundle of fibers.

* * * * *